NEGATIVE FEEDBACK AMPLIFIER

Filed March 28, 1968

INVENTORS
SUSUMO AKIYAMA
YUKIO MINE
BY
Hopgood & Calimafde
ATTORNEYS

United States Patent Office 3,473,136
Patented Oct. 14, 1969

3,473,136
NEGATIVE FEEDBACK AMPLIFIER
Susumu Akiyama and Yukio Mine, Tokyo, Japan, assignors to Nippon Electric Company, Limited, Tokyo, Japan
Filed Mar. 28, 1968, Ser. No. 716,857
Claims priority, application Japan, Mar. 31, 1967, 42/20,253
Int. Cl. H03f *1/08, 1/34*
U.S. Cl. 330—28 11 Claims

ABSTRACT OF THE DISCLOSURE

A wide-bandwidth high-frequency low-distortion negative feedback amplifier is described wherein a grounded base connected transistor stage is used. Transformer impedance-matching is used together with the generation of a resonance circuit tuned to a frequency substantially above the bandwidth to provide adequate phase margin, direct gain and feedback gain for low distortion.

Figure 1:
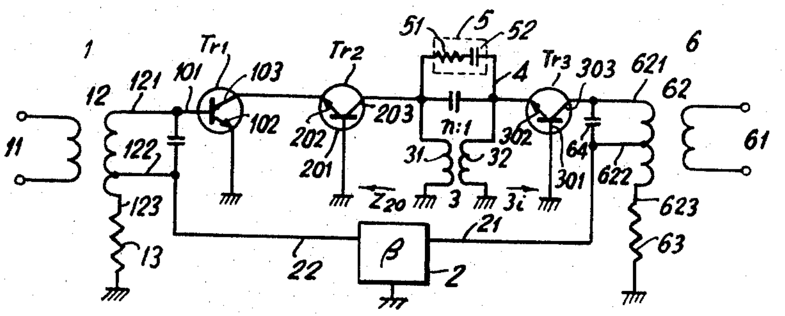

This invention relates to a wide bandwidth high frequency negative feedback amplifier with a highly improved distortion factor by fully utilizing the advantages of a grounded-base-connected transistor.

With increasing volume of communication, frequency division multiplexing coaxial carrier transmission systems have been developed with a wide bandwidth such as 4 mc. (960 channels), 12 mc. (2700 channels) and so forth. To accommodate future increases in communication demands and to keep pace with developments in the wide bandwidth communication field, it is expected that a system capable of handling nearly 10,000 channels, or even several tens of thousands to several hundred thousand channels will be needed. Accordingly an increasingly severe requirement is imposed on the negative feedback amplifier used in the line repeater of a frequency division multiplexing coaxial transmission system in that the amplifier should have a satisfactory distortion characteristic.

The negative feedback amplifier is mostly used in order to improve the distortion factor and obtain high gain stability. Nevertheless, it has become more difficult to secure a margin in the phase stability of the feedback ($\mu\beta$) characteristic, in view of the electron transit time. Phase margin is necessary to obtain a stable feedback without oscillations. Assume that an amplifying circuit of a negative feedback amplifier is used with a bandwidth wider than 12 mc. and is made according to the grounded-emitter connection method. In such circuit it is almost impossible to realize the necessary low distortion, especially with a bandwidth of 12 mc. and a very disappointing result is obtained with regard to the phase stability margin of the feedback ($\mu\beta$) characteristic.

The grounded-base connected transistor has advantages over the grounded-emitter transistor; one advantage is that the grounded-base transistor possesses a high distortion attenuation, and another advantage is that an excess phase transition due to parastic elements such as lead inductance will not arise. In the grounded-emitter transistor, the input signal is polarity-converted. Accordingly, an excess phase transition circuit network is formed by the high-frequency direct transmission term produced due to the emitter lead inductance and the capacitance between the base and the collector.

On the other hand, in the grounded-base connected transistor, the polarity of the input signal is identical to that of the output signal, and the excess phase transition circuit network is not formed even when a direct transmission term is introduced by parasitic elements. If, therefore, the grounded-base connected transistor is used for the output stage of a high-frequency wide-band negative feedback amplifier, it is generally expected that a large attenuation of distortion is obtainable and the phase stability margin of the feedback ($\mu\beta$) characteristics can be increased. However, the current gain of the grounded-base transistor is more than 1. If this grounded-base transistor is connected directly to the transistor of the preceding stage, the gain by the grounded-base transistor can hardly be obtained, and at the same time the distortion in the previous stage becomes fairly noticeable. In a narrow-bandwidth amplifier, such as an intermediate frequency amplifier, a current step-up transformer is inserted into the circuit between the grounded-base transistor and the preceding stage to improve said low current gain. Thus the normal current gain of the grounded-base transistor is obtained. When the grounded-base transistor is employed for the output stage of a high-frequency wide-bandwidth negative feedback amplifier and a current step-up transformer is used, the proper gain of the output stage can be secured and at the same time the distortion of the previous state can be reduced.

The addition of the current step-up transformer produces a problem with the gain frequency response. Specifically, the maxmum transmission feedback band, which is obtainable by the negative feedback amplifier, is determined primarily by the asymptotic slope of the gain frequency characteristic at the high-frequency end which is outside the transmission band. This is known from available negative feedback amplifier theory. Therefore, if the transformer is used, the attenuation of the high-frequency end is increased due to leakage inductance introduced by the transformer. Correspondingly, the maximum feedback obtainable in the transmission band is greatly reduced. The decrease in the feedback causes deterioration in the gain stability of the negative feedback amplifier, and lowers the distortion improvement characteristic which depends on negative feedback. The sole insertion of the current transformer cancels the advantages of the grounded-base transistor as described in the foregoing paragraph. In fact, the over-all characteristics of the negative feedback amplifier using grounded-base transistor then become worse than, for instance, where the grounded-base transistor is replaced with the grounded-emitter transistor. This is the reason why grounded-base transistors are generally not employed in high-frequency wide-bandwidth negative feedback amplifiers.

It is therefore an object of this invention to provide a negative feedback amplifier having a wide-bandwidth at high frequencies.

It is a further object of this invention to provide a negative feedback amplifier having a wide bandwidth at high frequencies with low distortion.

These objects are accomplished in accordance with the invention described as follows.

Figure 2:
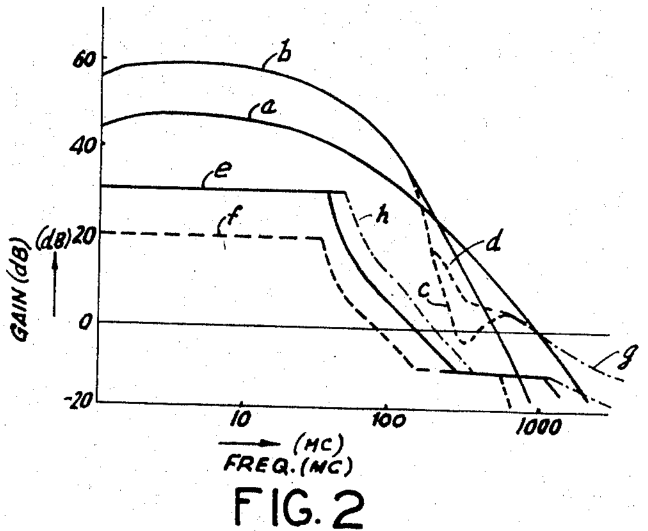
Figure 3:
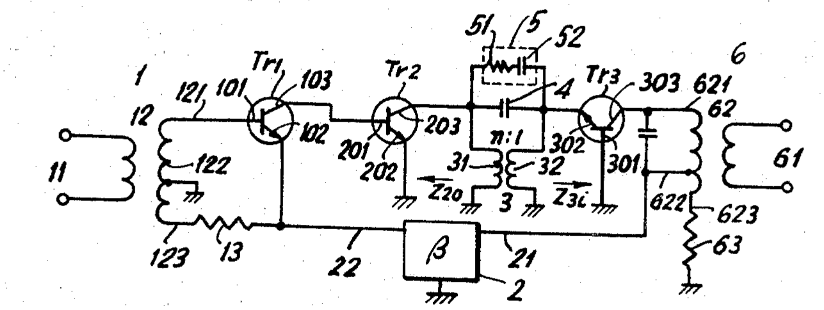
Figure 4:
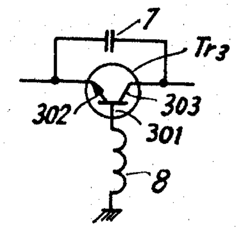

FIG. 1 is a circuit diagram showing an embodiment of this invention. FIG. 2 is a diagram illustrating the gain of an amplifier according to this invention. FIGS. 3 and 4 are circuit diagrams showing other embodiments of this invention.

Briefly stated, our invention contemplates a negative feedback amplifier utilizing a grounded-base-connected transistor as one of the amplifier stages and wherein a coupling circuit effectively eliminates the disadvantages introduced by a transformer coupling a preceding stage to the grounded-base-connected transistor whereby the advantages of the latter connected transistor are fully utilized.

According to one embodiment of the invention, a grounded-base-connected transistor is used as the last stage of an amplifier circuit having also one of the amplifying transistors connected as a grounded-emitter transistor in respect to the signal transmission of the feedback ($\mu\beta$) loop. All but one of the amplifying transistors are operated as grounded-base transistors, with negative feedback being effected by the one grounded-emitter transistor. A current step-up transformer is inserted between the last stage grounded-base transistor and the preceding transistor. The normal gain in the transmission band of the grounded-base transistor is thus obtained as well as a reduction in the signal distortion introduced by the preceding transistor. The high potential terminals of both windings of the transformer are linked by the use of a capacitor having a capacitance with which the leakage inductance resonates at a frequency higher than that of the upper end of the transmission band. Signals of a frequency higher than the resonance frequency are passed through the capacitor and thus the asymptotic loss due to transformer leakage inductance at a high frequency outside the transmission band is made neglible. In the circuit thus formed, the disadvantages such as small gain due to low current gain property of the grounded-base transistor and its large influence upon the distortion introduced by the previous state can be eliminated without causing an increase in the asymptotic loss, i.e., without reducing feedback. Consequently, a negative feedback amplifier is obtained whose distortion factor is markedly improved. It is to be noted that the transmission path of the feedback loop at high frequencies is determined by a grounded-base and a grounded-emitter transistor stage needed to realize the negative feedback. The phase changes introduced by parasitic elements of the transistors are minimized. As previously mentioned, no excess phase is produced due to parasitic elements in the case of a grounded-base-connected transistor. The phase margin is larger at a high frequency of the feedback ($\mu\beta$) characteristic providing higher stability than the conventional negative feedback amplifier using only a grounded-emitter-connected transistor. This increased phase margin can be allotted to widen the transmission band and obtain a high frequency wide bandwidth negative feedback amplifier.

According to this invention, the advantages of the grounded-base transistor are applied to offer a means for raising the frequency and widening the transmission band. More particularly, by providing first means in which a ground-base transistor has its input linked by an element such as a capacitor to a preceding stage and where the capacitor passes high frequencies and by further providing second means in which an element such as an inductor to establish a high impedance at high frequencies is inserted between the base and the ground, and parasitic elements are judiciously utilized, the direct transmission term is increased at high frequencies. In this manner, the gain roll-off is extended to occur at a higher frequency and the phase stability margin of the feedback ($\mu\beta$) characteristic is increased.

The invention will be more specifically explained by referring to the appended drawings. For simplification and to make the feature of the invention clear the D.C. circuit is not illustrated herein.

In the embodiment as in FIG. 1, only a transistor $T_{r1}$ is emitter-grounded, and other transistors, i.e. $T_{r2}$ and $T_{r3}$ of the middle and the last stage respectively, have their bases grounded. An input circuit 1 and an output circuit 6 are of endless type connection. A feedback signal is taken from the collector 303 of $T_{r3}$ to provide a negative feedback to the base of $T_{r1}$, thereby forming a 3-stage negative feedback transistor amplifier. To make the feedback negative, only one grounded-emitter transistor $T_{r1}$ is used. A transformer 3 is connected between the collector 203 of the middle stage transistor $T_{r2}$ and the emitter 302 of the last stage transistor $T_{r3}$. When the turns ratio of the primary winding 31 and secondary winding 32 is $n$:1, this transformer should be arranged to provide a turns ratio where $n>1$. The input and output signals of the transformer are of identical polarity. A capacitor 4 is connected between the high level side terminals of the windings 31 and 32 of the transformer 3. The capacitance of this capacitor is determined so that the resonance frequency with the leakage inductance of said transformer 3 is higher than that of the high frequency end of the transmission band of the amplifier. An impedance element 5 is formed by a series network comprising a resistor 51 and a capacitor 52 with the series network coupled in parallel with the capacitor 4. The purpose of this series network is to control the Q of the circuit at the resonance frequency. The impedance of this impedance network is chosen to be high enough so as not to disturb the operation of the transformer 3.

In general, the input impedance of the grounded-base transistor is very small. If, therefore, the transformer 3 is not inserted therein, the output impedance $Z_{20}$ of the middle stage transistor $T_{r2}$ becomes very high in comparison with the input impedance $Z_{3i}$. The impedance mismatch causes a large loss. If this impedance mismatching is mitigated by inserting the transformer 3 therein, the gain is increased by an amount corresponding to what was previously lost by the mismatch. This gain increase will be explained in view of current flow. The current flowing from the collector 203 of the transistor $T_{r2}$ to the primary winding 31 is stepped up at the rate of $n$-fold on the secondary winding 32 according to known transformer theory. The current then flows from the secondary winding 32 to the emitter 302 of the grounded-base transistor $T_{r3}$. In other words, by inserting the transformer 3 therein, the emitter current of the grounded-base transistor $T_{r3}$ is increased. This means equivalently that the current gain of the grounded-base transistor is effectively increased at least $n$-fold. Further, accompanying the gain increase, the output current level of $T_{r1}$ and $T_{r2}$ is made small relative to the output level of $T_{r3}$. Therefore, the signal distortion introduced by $T_{r1}$ and $T_{r2}$ can be made less influential on the over-all signal distortion of the amplifier circuit. When the grounded-base transistor is used in combination with the transformer in said manner, the low current gain problem conventionally associated with the grounded-base transistor is solved. Also the signal distortion in the previous stage can be reduced, because the grounded-base transistor itself possesses high signal-distortion-factor-improvement characteristics. However, it is to be noted that, if said transformer 3 is used therein, the gain outside of the transmission band of the amplifier is greatly reduced due to the leakage inductance inevitably associated with the transformer. FIG. 2 shows the relationship with regard to this gain change. The curve $a$ shows the amplifier gain characteristic when the transformer 3 is not inserted therein. The curve $b$ shows the amplifier gain characteristic when the transformer 3 is inserted. As illustrated in the figure, the gain in the transmission band is increased by inserting the transformer 3, whereas the gain outside the transmission band is decreased due to the leakage inductance of the transformer 3. The rate of decrease in the gain in curve $b$ as a function of frequency is increased with the slope of curve $b$ dropping off at a rate of 6 db./oct. faster than curve $a$. In other words, the frequency asymptotic loss increased at a rate of 6 db./oct.

Since the maximum feedback amount of a negative feedback amplifier is determined mostly by the high frequency asymptotic loss outside of the transmission band, the feedback ($\mu\beta$) characteristic for the curve $a$ as illustrated by curve $e$ is not obtained. Instead the feedback (NB) characteristic obtainable from the curve $b$ is $f$, so that the feedback in the transmission band is greatly reduced by the insertion of transformer 3.

According to this invention, this decrease in the feedback due to the insertion of said transformer 3 is removed by disposing the capacitor 4 in the manner as in FIG. 1. The frequency at which the leakage inductance of the transformer 3 and the capacitor 4 are resonated is chosen to be higher than that of the high frequency end of the transmission band. Therefore, in the transmission band, the increase of the total gain $b \times e$ depends on insertion of the transformer 3. Further, since the signals are passed through the capacitor 4 at a frequency higher than the resonance frequency, the gain curve *c* approaches the gain curve *a*. Because the high frequency attenuation of *c* is nearly the same as that of *a*, the ideal feedback ($\mu\beta$) characteristic *e* for the gain curve *c* can be obtained. Therefore, by disposing the capacitor 4 therein, the decrease in the feedback due to insertion of the transformer 3 can be prevented and the advantages of the transformer are retained. As shown in FIG. 2(*c*), the gain is decreased due to the resonance of the capacitor 4 and the leakage inductance of the transformer 3, at a frequency higher than that at the transmission band. This gain decrease can be utilized to transform the amplifier circuit gain into the idea feedback ($\mu\beta$) characteristic *e*. More particularly, the resonance frequency of the capacitor 4 and the leakage inductance of the transformer 3 can be controlled by suitably choosing the value of the capacitor 4. The Q of the resonance can be controlled as in FIG. 2(*d*) by adding thereto an impedance element 5 comprising a resistor 51 serially connected to a capacitor 52 as in FIG. 1. Thus the feedback ($\mu\beta$) can be adequately controlled. Said impedance element 5 comprising the resistor 51 and the capacitor 52 is not limited to such formation. What is important is that said element should have a high impedance so as not to cause influence on the operation of the transformer 3 in the transmission band but to control Q or the resonance at said resonance frequency.

In FIG. 1, the collector of $T_{r1}$ is connected directly to the emitter of transistor $T_{r2}$. However, if it is desired to obtain a gain in the transmission band of the amplifier circuit, a stage coupling circuit should be inserted between $T_{r1}$ and $T_{r2}$, as in the case of the stage coupling circuit inserted between $T_{r2}$ and $T_{r3}$. In FIG. 1, the input circuit 1 and the output circuit 6 are of endless type. However, other types may be adopted.

FIG. 3 shows another embodiment of this invention. The first and middle stage transistors $T_{r1}$ and $T_{r2}$ are of the grounded-emitter type, the last stage transistor is base-ground-connected and the input circuit 1 and output circuit 6 are of the endless type. The output terminal 22 of the feedback circuit 2 is connected directly to the emitter of $T_{r1}$ via the collector of $T_{r3}$ and feedback circuit 2, thereby effecting a negative feedback. The stage coupling circuit between $T_{r2}$ and $T_{r3}$ is constituted in the same manner as in the case of FIG. 1. In this embodiment, the first and middle stage transistors $T_{r1}$ and $T_{r2}$ are operated as grounded-emitter transistors with respect to the signals transmitted from the input to the output of the amplifier. Therefore, the gain of the amplifier circuit can be chosen to be high. In the feedback loop of FIG. 3, the output terminal 22 of the circuit 2 is connected directly to the emitter of $T_{r1}$. Accordingly, $T_{r1}$ is effectively operated as a grounded-base transistor at a high frequency, and only the transistor in the middle stage has its emitter grounded, with all other transistors base-ground-connected. Further explanation will be given below with regard to the signal transmission of the feedback loop of the allied circuits of $T_{r1}$. In FIG. 3, a feedback signal provided at the output terminal 22 of the feedback circuit 2 is led to a terminal 123 of a hybrid transformer 12 via the first transmission line of the emitter 102 of $T_{r1}$ and also via the impedance balance resistor 13. This signal is phase-inverted by the transformer and fed back to $T_{r1}$ by way of the second transmission line from the terminal 121 to the base 101 of $T_{r1}$. In the second transmission line, the high frequency portions of the signal are greatly attenuated due to the leakage inductance inevitable with the hybrid transformer 12 and the parasitic capacitance. Consequently, said second transmission line does not serve to carry the feedback signal at the high frequency end and only the first transmission line is effective for feedback transmission, so that $T_{r1}$ is actuated in the grounded base state with respect to the feedback ($\mu\beta$) loop.

In the ordinary input circuit of endless type as in FIG. 1, a counter-resonance may be brought about between the high frequency bypass capacitor and the leakage inductance presented between the terminals 121 and 122 of the hybrid transformer 12. The circuit 1 may also be influenced by the resonance of the hybrid transformer 12 itself. As a result, an unfavorable resonance phenomenon is introduced into the feedback ($\mu\beta$) characteristic. The input circuit as shown in FIG. 3 has the advantages that said first transmission line does not include a loss circuit over the frequencies covering the inside and outside of the transmission band, and that said second rtansmission line scarcely causes unfavorable resonance of the feedback ($\mu\beta$) characteristic attributable to the hybrid transformer 12 to which terminal 123, the feedback circuit, is connected via the resistor 123.

A three-stage amplifier has been explained by referring to FIGS. 1 and 3. It is to be noted that a higher gain can be obtained by increasing the number of grounded-base transistor to be included in the amplifier circuit and by suitably disposing a stage coupling circuit as used between $T_{r2}$ and $T_{r3}$ in FIG. 1 on the input side of the grounded-base transistors. The transformer 3 referred to in FIGS. 1 and 3 may be the two-winding type, or an autotransformer may be used.

According to this invention as has been explained, the transistors as connected herein provide an excess phase margin which is distributed for the purpose of widening the transmission band to produce a negative feedback amplifier operable in a wider frequency band than heretofore possible with conventional amplifiers using grounded-emitter connected transistors.

FIG. 4 shows another embodiment of this invention. The aim of this embodiment is to provide a negative feedback amplifier for a high frequency wide band, by positively utilizing the advantage of the grounded-base transistor. The emitter 302 and the collector 303 of a grounded-base transistor $T_{r3}$ are linked through a capacitor 7, in the manner as shown in FIG. 4, and a coil 8 is inserted between the base 301 and the earth. Ordinarily the current amplification of the grounded-base transistor $T_{r3}$ decreases at a rate of 6 db/oct above the alpha cutoff frequency. If, as in FIG. 4, a capacitor 7 is connected thereto, the high frequency signal is bypassed through this capacitor 7 and transmitted directly to the collector 103. Therefore, the gain reduction slope of 6 db/oct can be mitigated. Further, with a coil 8 connected between the base 101 and the earth, the high frequency current is stopped from flowing from the base 301 to ground and in this manner the gain roll of slope of 6 db/oct can be mitigated. With the direct transmission of high frequencies, the high frequency gain characteristic of the amplifier circuit is as shown in FIG. 2(*g*), and the phase stability margin of the feedback ($\mu\beta$) characteristic can be increased. The portion of this phase margin increase may be distributed for the purpose of widening the transmission band to obtain a wide bandwidth negative feedback amplifier. It is to be noted that the addition of a capacitor 7 and a coil 8 to a grounded-emitter transistor circuit will have an adverse effect. The grounded-emitter transistor provides a phase inversion so that a direct phase term introduced by the capacitor 7 and coil 8 reduces the phase margin and cannot be tolerated. For this reason, the method of FIG. 4 is effective only in the case of the grounded-base connected transistor or grounded-collector connected transistor in both of which circuits the phase of the input signal is identical to that of the output signal.

The invention will be explained by referring to a practical example. In the circuit of FIG. 3, assume that:

| | |
|---|---|
| *ft* of $T_{r1}$ ________________mc__ | 2500 |
| *ft* of $T_{r2}$ ________________mc__ | 1300 |
| *ft* of $T_{r3}$ ________________mc__ | 1300 |
| Total power consumption __________ | 21 v., 150 ma. |

Under this condition, the following negative feedback amplifier for a wide transmission band is obtained.

| | | |
|---|---|---|
| Transmission band | mc | 0.3–40 |
| Feedback in the transmission band | db | 25 |
| Feedback at the point of 40 mc. | db | 20 |
| Secondary attenuation at the point of 40 mc. | db | [1] 66 |
| Tertiary attenuation at the point of 40 mc. | db | [1] 90 |

[1] Output level: +10 db.

As has been specifically explained, this invention provides a wide bandwidth stable negative feedback amplifier with a grounded base connected transistor.

The negative feedback amplifier according to this invention is distinctly useful especially in the case of wide band coaxial cable carrier transmission system where a high signal distortion factor improvement is of prime importance.

We claim:

1. A wide bandwidth low distortion negative feedback amplifier comprising:
   - means providing amplification and phase inversion of an input signal,
   - a grounded base connected transistor output stage,
   - a transformer coupling the inverted amplified input signal to the grounded base connected transistor stage to provide an impedance match therebetween, and
   - a tuning circuit effectively coupled between the input and output of the transformer, said tuning circuit providing a resonance at a frequency substantially higher than the high frequency end of the bandwidth of the amplifier, and
   - means providing negative feedback from the grounded base connected output stage to the input of the amplifier.
2. The device as recited in claim 1 wherein the tuning circuit comprises:
   - a first capacitor coupling the input of the transformer directly to the output and adjusted in value to provide said resonance frequency with the leakage inductance of the transformer.
3. The device as recited in claim 2 wherein the tuning circuit still further includes:
   - a second capacitor and
   - a resistor in series connection with the second capacitor for controlling the Q of the resonance circuit,
   - said series connected second capacitor and resistor coupled across the first capacitor, the value of the capacitor being selected to present a high impedance at frequencies within the pass band and a low impedance at the resonance frequency.
4. The device as recited in claim 1 and further including a capacitor coupling the input of the grounded base connected transistor to the output, said capacitor being selected to essentially only bypass the frequencies above the alpha cut off frequency of the grounded base connected transistor.
5. The device as recited in claim 2 and further including:
   - an inductance interconnecting the base of the grounded base connected transistor to ground and having a value selected to provide a short at frequencies within the bandwidth and a high impedance at frequencies above the alpha cut off frequency of the grounded base connected transistor.

6. The device as recited in claim 1 wherein the means providing amplification and phase inversion comprises:
   - a grounded emitter connected transistor stage coupled to the input signal, and
   - a second grounded base connected transistor stage responsive to the output of the grounded emitter connected transistor having its output coupled to the input of the transformer.
7. The device as recited in claim 1 wherein the means providing amplification and phase inversion comprises:
   - a second transistor stage and
   - means responsive to the input signal and the feedback signal for providing a normally grounded emitter connected second transistor at frequencies within the bandwidth and an effectively grounded base connection of the second transistor at frequencies higher than the bandwidth.
8. The device as recited in claim 7 wherein said second transistor stage comprises:
   - a second transistor having a base, an emitter and a collector,
   - a transformer coupling the input signal to the base and the emitter of the second transistor, where said feedback providing means couples the feedback directly to the emitter and to the transformer, and
   - wherein the collector of the second transistor is effectively coupled to the transformer.
9. The device as recited in claim 8 and further including:
   - a third transistor stage interposed between the second transistor and the transformer for coupling said normally emitter grounded connected second transistor stage to said transformer.
10. The device as recited in claim 1 wherein said transformer provides current amplification to provide said impedance match.
11. A wide bandwidth low distortion negative feedback amplifier comprising:
    - a grounded emitter connected transistor amplifier stage coupled to an input signal,
    - a grounded base connected transistor amplifier stage,
    - means providing negative feedback from the grounded base connected transistor stage to the grounded emitter connected transistor stage,
    - means coupling the grounded emitter connected transistor stage to the grounded base connected transistor stage and including:
      - a transformer and
      - a tuning circuit,
      - with said tuning circuit coupled across the transformer and adjusted to provide a resonance circuit effectively in series with the amplification loop, with said tuning circuit adjusted to provide a resonance frequency substantially higher than the high frequency end of the bandwidth.

References Cited

UNITED STATES PATENTS 3,413,563 11/1968 Tongue ............ 330—27

ROY LAKE, Primary Examiner

J. B. MULLINS, Assistant Examiner

U.S. Cl. X.R.

330—20, 166